April 10, 1951 R. A. F. JACKSON 2,548,218
STOVE HEATED BY GAS OR ELECTRICITY
Filed May 16, 1949 3 Sheets-Sheet 1
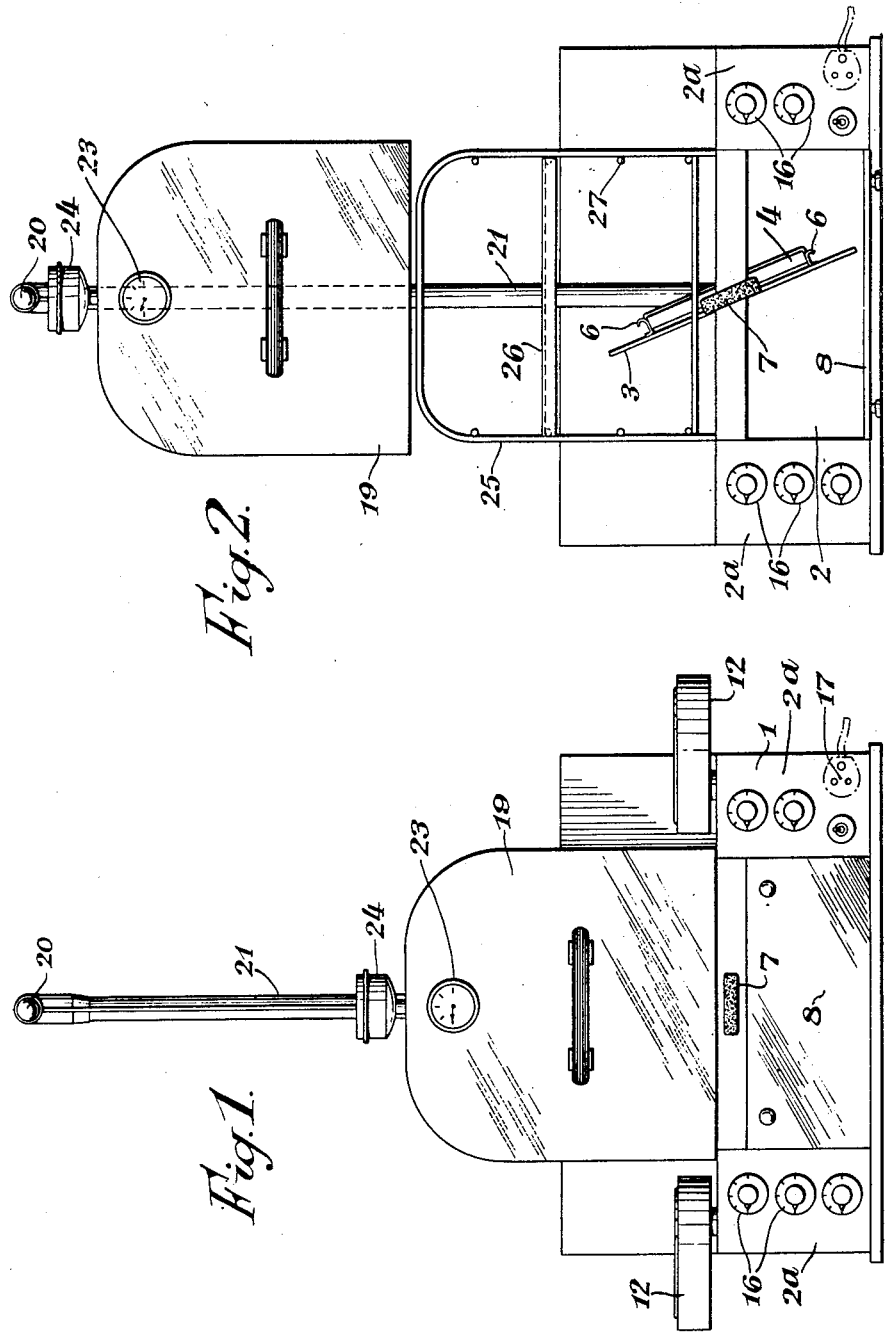
INVENTOR
ROBERT ALFRED FREDERICK JACKSON,
by John B. Brady
ATTORNEY April 10, 1951  R. A. F. JACKSON  2,548,218
STOVE HEATED BY GAS OR ELECTRICITY
Filed May 16, 1949  3 Sheets-Sheet 2
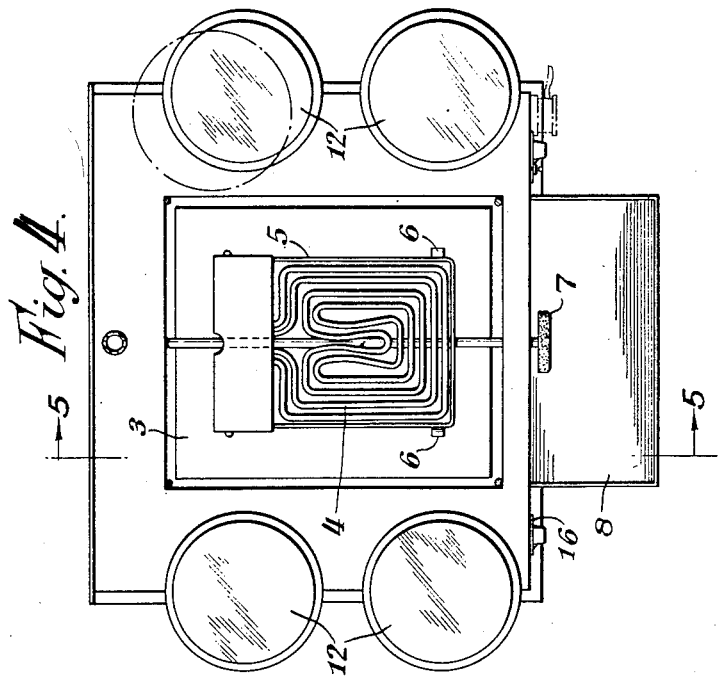
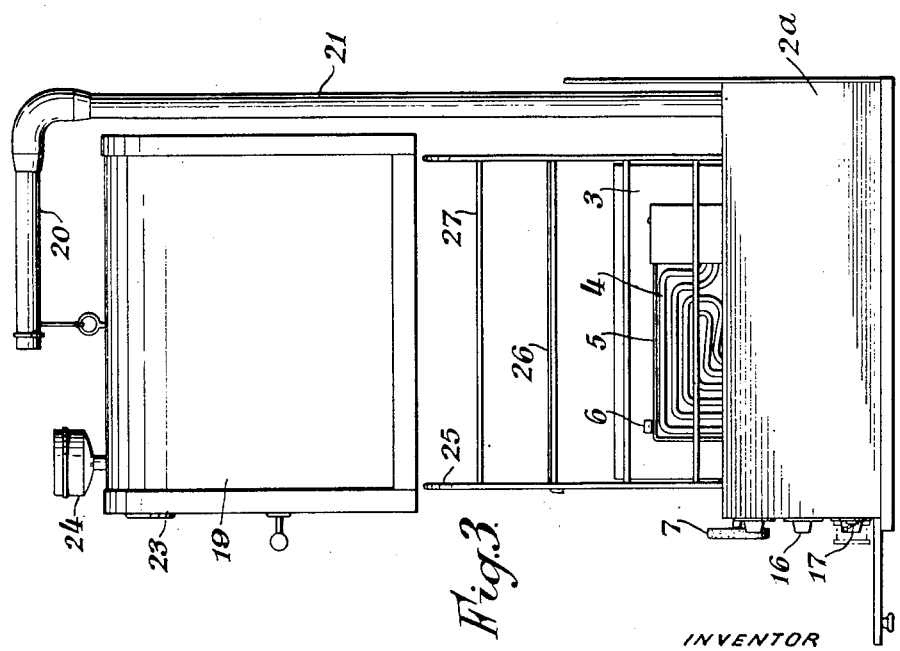
INVENTOR
ROBERT ALFRED FREDERICK JACKSON,
by John B. Brady
ATTORNEY April 10, 1951 — R. A. F. JACKSON — 2,548,218
STOVE HEATED BY GAS OR ELECTRICITY
Filed May 16, 1949 — 3 Sheets-Sheet 3
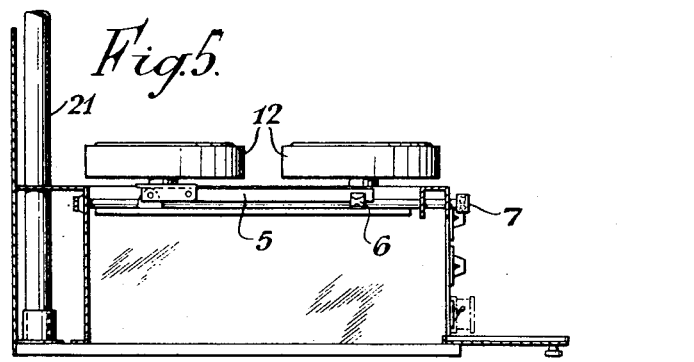
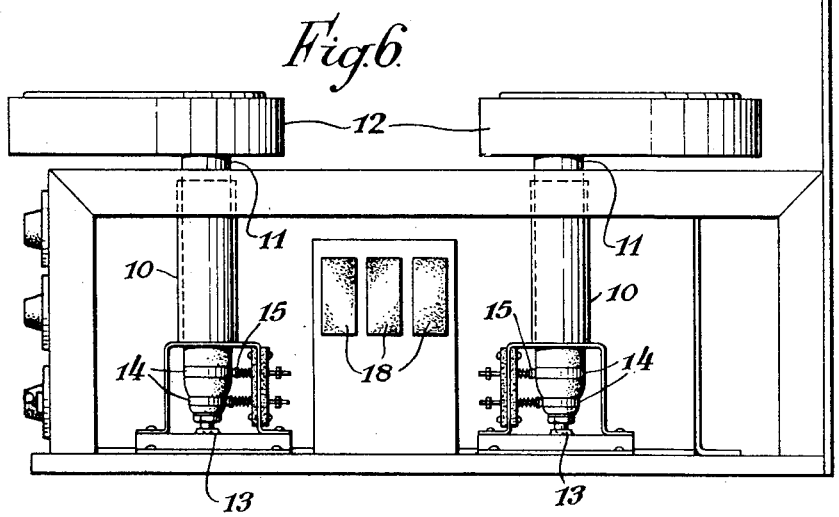
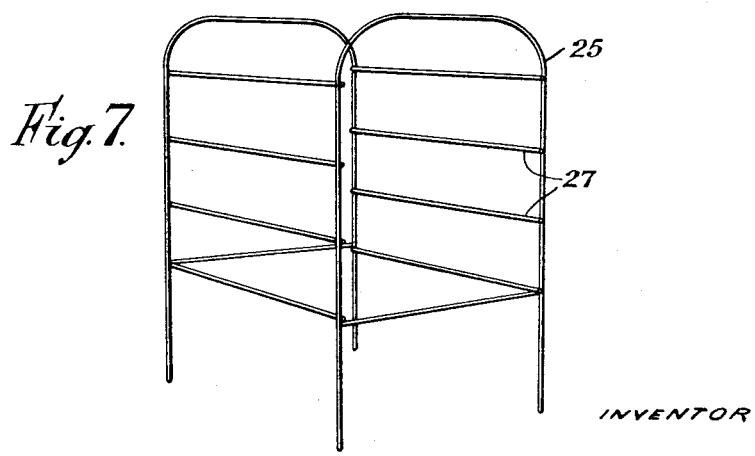
INVENTOR
ROBERT ALFRED FREDERICK JACKSON,
by John B. Brady
ATTORNEY Patented Apr. 10, 1951

2,548,218

UNITED STATES PATENT OFFICE 2,548,218

STOVE HEATED BY GAS OR ELECTRICITY

Robert Alfred Frederick Jackson,
Bearsden, Scotland

Application May 16, 1949, Serial No. 93,487
In Great Britain May 18, 1948

2 Claims. (Cl. 219—35)

This invention relates to cooking stoves heated by gas or electricity and comprises improvements designed to reduce the cost of manufacture in relation to the cooking capacity of the apparatus, to provide a more compact and adaptable cooker than those at present in use and to facilitate expansion of the cooker to increase its capacity when additional cooking capacity is required.

According to the invention, a cooker is composed of a main base or casing forming a chamber for grilling or warming and having at least one electric or gas heater for directing heat downwards for grilling or warming and upwards for boiling or baking, an oven space being formed above the main base or casing by a sheet metal or other casing which can be removed from the main base or casing to enable the heater or heaters thereof to be used for boiling. To prevent waste of heat when the cooker is required for grilling or warming only or for boiling or baking only, separately controllable or interchangeable heaters may be provided for directing heat upwards or downwards as required. Alternatively, a single heater may be adjustable for the purpose of directing its heat either upwards or downwards.

The main base or casing takes up very little space and can be used alone for boiling, grilling and/or warming plates or dishes. It is readily converted into a closed cooker or oven by means of the sheet metal or other oven casing, which may, if desired, be constructed so that it can be stowed away when not required. The invention thus provides a cooker for boiling, grilling, warming and baking which can be accommodated in a very small space and may have only one gas or electric heating member or element.

According to a further feature of the invention, in order to provide additional boiling capacity, the main base or casing is adapted to carry a number of gas rings or electric hot plates, preferably on one or both sides thereof, which may be detachable or made to swivel or slide in any direction or to fold down at the side of the main base or casing when not required for use. Advantageously, the main base or casing is provided with sockets or attachment devices for, say, four gas rings or electric hot plates so that the capacity of the cooker can be increased by the addition of one or more gas rings or hot plates whenever desired.

The nature of the invention and the manner in which the same is to be performed will be fully understood from the following description of one example of an electric cooking stove according to the invention, reference being made to the accompanying drawings in which:

Figure 1 is a front view of the complete stove showing the oven casing and the door to the warming and grilling space in closed positions, Figure 2 is a view showing the oven casing and the door to the warming and grilling space in open positions and showing the heater in a partly rotated position to indicate the method of reversing it, the auxiliary hot-plates being removed, Figure 3 is a side view, Figure 4 is a plan view, Figure 5 is a section taken on the line 5—5 of Figure 4, Figure 6 is a side view of the main base or casing with the outer side wall removed to show the sockets for the brackets that support the hot-plates, and Figure 7 is a perspective view of an oven shelf frame.

In the drawings, the reference numeral 1 indicates the main base or casing consisting of a shallow rectangular box made of sheet metal. This box has a middle compartment 2 constituting a chamber for grilling or warming and two side compartments 2a which are completely enclosed and separated from the compartment 2 and are adapted to contain control switches, fuses, and sockets for receiving the supporting brackets of auxiliary hot-plates as hereinafter described.

Mounted on the top wall 3 of the casing 1 is an electric heating element 4 of the type consisting of a tubular heating element bent into the shape of a grill and supported by a frame 5 which is hinged to the top wall 1 of the casing so that it can be swung away from the top wall for inspection and cleaning. A pair of spring clips 6 are provided for holding the frame 5 in the normal position in which it lies parallel with and close to the top wall 3 of the casing. The top wall 3 may be heat-insulated on the side remote from the heating element 4, but it is preferred to give the top wall a highly reflecting surface and to rely on its reflecting action to direct most of the heat from the heating element 4 to one side of the top wall 3, i. e., towards the side on which the heating element is mounted. The top wall 3 with the heating element 4 is carried by a horizontal spindle controlled by a handle 7 which is accessible from the front of the casing 1 and by which the top wall 3 can be rotated in the manner indicated in Figure 2 of the drawings so as to direct heat either upwards or downwards as required. A door 8 is provided at the front of the casing 1 to give access to the chamber 2 so that it can be used as a grilling chamber or as a hot chamber for food or plates. Alternatively the element 4 may be detachable and can be re-plugged in position lying at its alternative inclination.

Each of the compartments 2a of the main casing contains a number of tubular sockets 9 supported at their upper ends in openings provided for them in the top wall of the compartment and at their lower ends by brackets 10 attached to the bottom wall of the compartment. Each of these tubular sockets is adapted to receive a tubular bracket 11 attached to an electric hot-plate 12, the tubular brackets 11 being fixed at right-angles to the hot-plate and eccentrically thereto so that the hot-plate can be adjusted by swinging it about the axis of the socket. The bracket 11 is adapted to bear at its lower end against a seating 13. It is provided with a pair of insulated terminal contact rings 14 adapted to co-operate with spring loaded wipers 15 mounted on the bracket 10. The lower contact ring is of smaller diameter than the upper contact ring. The bracket 11 is thus easily withdrawable from the tubular socket 9. The wipers 15 automatically make contact with the rings 14 when the bracket is inserted into the tubular socket. The wipers are thus adapted to supply current through contact rings 14 to the heating element or elements of the hot-plate, whilst allowing the bracket 11 that supports the hot-plate to rotate freely.

The stove is provided with control switches 16 for regulating the supply of current to the main heating element 4 and to the auxiliary hot-plates 12, these control switches being mounted in the side compartments of the main casing 1 and having suitable control handles that project through the front walls of these side compartments. The control switches may be of any known or preferred type capable of being adjusted to any one of a number of positions for regulating the heating effect of the heating elements they control by a thermostatic regulating action. The method of wiring these control switches to the main heating element and wipers 15 and to an inlet socket 17 provided on one of the side compartments of the main casing and fuses 18 enclosed within one of the side compartments will be well understood by those skilled in the art and need not be described herein.

For the purpose of forming an oven space above the main base 1, an oven casing element 19 is provided. This casing element is open at its lower side and is designed to stand on the main casing 1 so as to form an oven space above the heating element 4. It is supported by a simple counterpoised suspension mechanism mounted in a tubular post 21 carrying an arm 20 from which the oven casing 19 is suspended so that it can be easily raised and lowered. The suspension mechanism is adapted to suspend the oven casing in the raised position shown in Figure 2 to give access to the oven space. The post 21 which is spigotted into a socket 22 provided for it at the rear of the base or casing 1 and is rotatable in this socket so that the oven casing element can be swung out of the way by rotating the post 21 in the socket 22 when the oven casing has been raised to the position shown in Figure 2. The post 21 can be withdrawn from the socket 22 so as to remove it entirely, together with the oven casing, when desired.

The oven casing element 19 is heat-insulated and is provided with a thermometer 23 for indicating the interior oven temperature. The part 24 is a small steel wool filter which takes the place of the ventilator ordinarily provided on oven cookers.

A detachable wire frame 25 adapted to stand on the main casing 1 is provided for supporting one or more oven shelves such as that shown at 26 in the drawings, each shelf being slidably supported on bearers 27 forming part of the frame 25. The shelf frame 25 is completely detachable to facilitate cleaning. It is adapted to stand on the main casing 1 independently of the oven casing element.

The base or main casing 1 of the stove constitutes a basic unit which can be sold without the oven casing element 19, and with or without one or more auxiliary hot-plates 12, as a cooker for boiling, grilling and warming plates or dishes. It is readily converted into a closed cooker by the addition of the oven casing element 19 and its supporting bracket. Moreover additional auxiliary hot-plates can be added as required to increase the boiling capacity of the stove to the maximum provided for by the sockets in the body or main casing.

The invention thus provides for unit construction and allows additional elements to be added as required to increase the total capacity of the apparatus.

A gas cooker according to the invention is constructed similarly to the electric cooker described and shown in the accompanying drawings, a gas heater being substituted for the electric heating element 4 and gas rings being substituted for the hot-plates 12. The gas rings are carried by tubular brackets adapted to spigot into supporting sockets provided for them in the side compartments of the main casing, the tubular brackets constituting the gas mixture conduits of the gas rings and being adapted to co-operate with gas nozzles permanently fixed in the side compartments of the main casing. A gas heater substituted for the electric heater 4 could be supplied with gas through a rotatable coupling or it could be arranged to rotate about the axis of a gas-mixture conduit forming part of the gas heater and arranged to co-operate with a gas nozzle fixed to the main casing co-axially with the gas-mixture conduit.

I claim:

1. A cooking stove comprising a main casing having a cooking compartment and at least one side compartment shut off from said cooking compartment, said casing having a top wall, a reversible main heater in said top wall capable of directing heat either upwards from said top wall or downwards therefrom into said cooking compartment, a plurality of openings in said top wall communicating with said side compartment, a plurality of auxiliary heater supply sockets in said side compartment aligned with said openings respectively, and a plurality of auxiliary heaters having tubular supports capable of being inserted through said openings and engaged in said sockets, said side compartment containing also a plurality of switches for controlling said main heater and auxiliary heater supply sockets respectively.

2. A cooking stove as claimed in claim 1, wherein each said auxiliary heater comprises a hot-plate fixed at right-angles to its tubular support and ecentrically thereto, said tubular supports being rotatable in said sockets for adjusting said hot-plates.

ROBERT ALFRED FREDERICK JACKSON.

REFERENCES CITED

The following references are of record in the file of this patent:

UNITED STATES PATENTS

| Number | Name | Date |
|---|---|---|
| 184,810 | Whitehead | Nov. 28, 1876 |
| 1,550,707 | Moore | Aug. 25, 1925 |
| 2,055,972 | Fritsche | Sept. 29, 1936 |
| 2,305,672 | Challet | Dec. 22, 1942 |
| 2,417,977 | French | Mar. 25, 1947 |
| 2,510,116 | Kaplan | June 6, 1950 |

FOREIGN PATENTS

| Number | Country | Date |
|---|---|---|
| 522,156 | France | July 27, 1921 |